US008667930B2

(12) United States Patent
Hornung

(10) Patent No.: US 8,667,930 B2
(45) Date of Patent: Mar. 11, 2014

(54) METHOD AND APPARATUS FOR AVERTING WATERFOWL SETTLEMENTS

(76) Inventor: Raymond T. Hornung, Chicago, IL (US)

(*) Notice: Subject to any disclaimer, the term of this patent is extended or adjusted under 35 U.S.C. 154(b) by 622 days.

(21) Appl. No.: 12/886,651

(22) Filed: Sep. 21, 2010

(65) Prior Publication Data

US 2012/0067296 A1    Mar. 22, 2012

(51) Int. Cl.
*A01M 29/10* (2011.01)

(52) U.S. Cl.
USPC .......................... 119/713; 52/101; 116/22 A

(58) Field of Classification Search
USPC ................ 119/713, 712, 719, 721, 174, 905; 340/573.2, 573; 52/101; 116/22 A
See application file for complete search history.

(56) References Cited

U.S. PATENT DOCUMENTS

| 2,367,818 | A |   | 1/1945 | Diehl |   |
|---|---|---|---|---|---|
| 3,307,208 | A |   | 3/1967 | Jacobson |   |
| 3,698,025 | A | * | 10/1972 | Worobel | 441/16 |
| 4,099,282 | A | * | 7/1978 | Townsend | 441/16 |
| 4,464,129 | A | * | 8/1984 | Vancheri et al. | 441/16 |
| 4,896,620 | A | * | 1/1990 | Jones | 114/253 |
| 5,163,858 | A | * | 11/1992 | Sumrall | 441/7 |
| 5,253,444 | A | * | 10/1993 | Donoho et al. | 43/1 |
| 5,270,707 | A | * | 12/1993 | Schulte et al. | 340/981 |
| 5,341,759 | A | * | 8/1994 | Hood | 114/255 |
| 5,433,029 | A | * | 7/1995 | Donoho et al. | 43/1 |
| 5,450,063 | A | * | 9/1995 | Peterson et al. | 340/573.2 |
| 5,956,880 | A | * | 9/1999 | Sugimoto | 43/2 |
| 5,969,593 | A | * | 10/1999 | Will | 340/384.2 |
| 6,190,022 | B1 | * | 2/2001 | Tocci et al. | 362/259 |
| 6,226,933 | B1 | * | 5/2001 | Nelson et al. | 52/101 |
| 6,407,670 | B1 | * | 6/2002 | Dysarsz et al. | 340/573.2 |
| 6,508,204 | B1 | * | 1/2003 | Matheson et al. | 119/713 |
| 6,519,901 | B1 | * | 2/2003 | Nelson et al. | 52/101 |
| 6,557,482 | B1 | * | 5/2003 | Doty et al. | 116/22 A |
| 6,575,597 | B1 | * | 6/2003 | Cramer et al. | 362/259 |
| 6,681,714 | B1 | * | 1/2004 | Johnson | 116/22 A |
| 6,793,364 | B2 | * | 9/2004 | Cramer et al. | 362/112 |
| 6,940,424 | B2 | * | 9/2005 | Philiben et al. | 340/945 |
| 7,028,633 | B2 | * | 4/2006 | Pinton et al. | 116/22 A |
| 7,196,477 | B2 | * | 3/2007 | Richmond | 315/149 |
| 7,429,827 | B2 | * | 9/2008 | Richmond | 315/149 |
| 7,506,815 | B2 |   | 3/2009 | Spiegel |   |
| 7,596,910 | B1 | * | 10/2009 | Donoho | 52/101 |
| 7,699,018 | B2 | * | 4/2010 | Wells | 116/22 A |
| 7,784,980 | B2 | * | 8/2010 | Tsao et al. | 362/431 |
| 7,859,425 | B2 | * | 12/2010 | Glasa et al. | 340/693.5 |

(Continued)

OTHER PUBLICATIONS

Wikipedia, The Free Encyclopedia, Article entitled "Visible Spectrum," 4 pages.

*Primary Examiner* — Yvonne Abbott

(74) *Attorney, Agent, or Firm* — Leydig, Voit & Mayer, Ltd.

(57) ABSTRACT

This invention relates to a method and apparatus for averting water fowl settlements using a humane, non-lethal, optionally solar and rechargeable battery operated microcontroller controlled by preset code, a multi-patterned and changing light generating apparatus, with at least 500 nm to 570 nm visible and 300-399 nm ultraviolet spectrum LED lights, activated by means for sensing ambient light levels to determine activation periods and resting periods for retraining water fowl to relocate settlements to an alternate location by disrupting their dark-adapted night vision. The apparatus may be in the form of a floating buoy or a land or other structural surface mountable device and includes means to prevent perching thereon.

16 Claims, 6 Drawing Sheets

Floatation Buoy

(56) References Cited

U.S. PATENT DOCUMENTS

| | | | |
|---|---|---|---|
| 7,941,977 B2 * | 5/2011 | Donoho | 52/101 |
| 8,127,702 B2 * | 3/2012 | Scarcello et al. | 114/221 R |
| 8,164,462 B1 * | 4/2012 | Bose et al. | 340/573.1 |
| 8,226,260 B2 * | 7/2012 | Whalan | 362/152 |
| 2003/0201874 A1 | 10/2003 | Wu | |
| 2007/0188334 A1 | 8/2007 | Spiegel | |
| 2007/0193498 A1 * | 8/2007 | Wells | 116/22 A |
| 2007/0205904 A1 * | 9/2007 | Froehner | 340/573.2 |

* cited by examiner

Floatation Buoy

Bird Spike - A

Bird Spike - B

Land Base Unit

Operational Flowchart

Rooftop / Portable Base Unit

METHOD AND APPARATUS FOR AVERTING WATERFOWL SETTLEMENTS

STATEMENT REGARDING FEDERALLY SPONSORED RESEARCH AND DEVELOPMENT

This invention was not made with Government support under any Grant or award. The Government does not have rights in this invention.

FIELD OF INVENTION

This invention relates to a method and apparatus for effectively repelling water fowl such as geese and ducks by use of light beams in a humane manner.

BACKGROUND OF THE INVENTION

The present invention provides a method and apparatus to avert water fowl settlements at night by using a humane, non-lethal method which is not objectionable to humans. Since it is proven that hazing of waterfowl, using certain methods, during daytime hours is effective, it stands to reason that a nighttime hazing process or program will be just as effective. Since it is dangerous and cost prohibited to man a hazing program at night, it is desired to haze in an unmanned manor in order to avert waterfowl settlements. While this invention may prove to be effective on other species of waterfowl, it is geared mainly towards hazing Canadian Geese by resetting their dark-adapted nighttime vision.

There are essentially two types of Canadian Geese. Interior Canadian Geese and Giant Canadian Geese. Interior Canadian Geese reside mainly in the United States and migrate from northern states to southern state. Giant Canadian Geese migrate from Canada to the United States. For practical purpose, Interior Canadian Geese will be referred to as resident geese and Giant Canadian Geese will be referred to as non-resident geese. Resident geese have a small territory that they habituate annually and they do not migrate to Canada. Non-resident geese are those that migrate to Canada annually.

This invention is meant to deal with the resident geese because they do not migrate far enough from their home territory like the non-resident geese. This invention is also meant to help keep migrating geese on the move and preventing them from becoming resident, non-migrating geese. The longer geese have access to a property unchallenged by predators or hazing, the stronger their tie to the land becomes, and with the stronger tie to the land, the harder it is to remove the geese from that property. Thus, the possibility of these non-migrating geese becoming resident geese increases.

There are many known and tried methods available today to remove geese from a property. Some of the methods in use today include but are not limited to: chemical repellants applied to turf, noise makers, barriers, visual deterrents such as balloons and Mylar tape, playback of recorded distress calls, lasers, flashing lights dead goose decoys and border collies are all methods used today. Some are more expensive than and others and some are more effective than others.

Chemical repellants are expensive, have limited residual effect and may have currently unknown environmental consequences.

Noise makers such as air cannons are not usually welcomed in residential areas and again have limited use while waterfowl may adapt quickly to the sound.

Visual deterrents such as balloons and Mylar tape barriers also provide limited results.

Playback of recorded distress calls have limited results as well since birds may quickly learn that the distress call is a false alarm.

Lasers and flashing lights are effective mostly during the dusk hours. However, it is not practical to man a laser during the nighttime hours.

Dead goose decoys have limited results when not combined with other methods.

Border collies provide one of the most effect methods of deterring waterfowl settlements during the day time hours. However, it is not practical nor is it safe to continue such a deterrent method at night.

Some methods will initially scare off geese, but geese are smart birds and they will quickly adapt to a new environment if it does not pose a real threat to their safety. The goal of this invention is to produce a method that will pose a serious enough disturbance or threat to the safety of the flock, that is not easily adaptable by the geese. The present invention will temporally disable resting waterfowl from visually detecting predators in their surroundings by disrupting their dark-adapted nighttime vision.

Waterfowl, specifically geese, appear to have several levels of defense against predators. Their first level of defense is the "watchdog(s)" of the flock. There is always at least one whom is watching for predators while the flock is grazing or resting. This one is the watchdog. When a predator is approaching, the watchdog will sound an alarm or distress call to alert the rest of the flock to the threat. Their second level of defense is entering the water. Assuming that water is very nearby, the flock will retreat into the water after the predator approaches within a certain distance of the flock. Their third level of defense is flight. If the safety of the water defense is penetrated, the flock will take flight for another area that is not as threatening. Usually, the flock will direct themselves to another nearby well known grazing area. Resident geese have a short list of resting and feeding areas from which they choose. So it is important to keep your property off that list.

The present invention is used to keep non-resident geese from becoming resident geese, and to remove geese from your property, by constantly resetting the dark-adapted nighttime vision of geese, thereby, changing their safe nighttime habitat they seek. Geese will usually, at night, rest on the water, away from land predators. Geese use their last level of defense, water, at night to protect themselves from predators. Geese spend a majority of their night resting on the water where it is safe. Once on the water for the night, geese use their first level of defense, their eyesight and the flocks watchdog to monitor their surroundings for predators. This is where and when the present invention intends to avert waterfowl from settling.

Geese have excellent eyesight. They have four retinal cones which allow them to see in the visible light spectrum as well as the UV spectrum. The visual light spectrum is from 400 nm to 700 nm, on frequency to a band ranging from about 400 to 790 THz. The UV spectrum is from around 300 nm to 399 nm. This invention operates within both the UVA and visual light spectrum. The goal of this invention is to temporarily incapacitate the visual defense system of the watchdog and flock by flashing distinct multiple patterns of light from both the UVA and visual light spectrum thereby making the zone unsafe to inhabit for the night. This is done by resetting the dark-adapted nighttime vision of waterfowl using LED's in the light spectrum mentioned earlier. It is believed that once the waterfowl obtained their dark-adapted nighttime vision, it can be interrupted and rest with a flashing light pattern that operates in both the visual and UVA light spectrum, which the waterfowl cannot adapt to the pattern nor give their eyes time to regain the optimum dark-adapted nighttime vision required for night time safety. This is exactly what will drive the flock from its location and avert their future settlements. At twilight, rods in the human eye provide most of the vision and green is brilliantly brighter at dusk and dark than during daylight. Red, and amber, its close relative, on the light spectrum chart, have little effect on the rods of the human eyes. That is why most navigational equipment is back-light in either red or amber so as not to disrupt or reset the full dark-adapted nighttime vision of the captain so that he/she may scan the waterways for obstructions. Once the full dark-adapted nighttime vision has been interrupted, it may take as long as 30 minutes to regain it. Red lights and amber lights do not disrupt the full dark-adapted nighttime vision once it is achieved. Since geese see in the same spectrum of visual light as we humans, it can assumed the same full dark-adapted nighttime vision principles apply. This scientific fact regarding dark-adapted nighttime vision in humans, it can be applied to geese as well since their receptors for vision are similar to the human eyes. In addition, the geese see within the UV spectrum as well. This is why this invention uses the green spectrum of 500 nm to 570 nm on frequency to a band about 540 THz., the green region of the visual spectrum, the brightest color perceived by the rods at dusk and nighttime, and the UVA spectrum of 300 nm to 399 nm, a spectrum also seen by geese. The 500 nm to 570 nm on frequency to a band about 540 THz produces the maximum sensitivity to the rods within the eye once dark-adapted night time vision has been achieved. The choice of these specific light spectrum LED's produced the best results in testing and is preferred for use within this invention.

It was discovered through testing, that by shining a bright hand held spotlight into a flock of waterfowl resting on the water late at night, that distress calls could be generated within the flock. Distress calls are usually sent to alert the flock to immediate danger and be prepare the flock for flight. As long as the light remained constant, the waterfowl would begin to relax, turn their backside toward the direction from which the bright light was emanating, and soon the distress calls ceased. However, if the spotlight was flashed in a repetitive rhythmic cycle, for example on 1 sec and off 1 sec distress calls were once again generated. Testing of the rhythmic flash cycle again found the flock turning their backs to the light source and adapted to the rhythmic cycle of the flashing of the spotlight. The waterfowl adapted rather quickly to this method and found them to turn their heads away from the light to avoid disrupting their dark-adapted vision and were soon able to put up a defensive position to regain their safety once again.

Initial testing of the apparatus using a rhythmic, 50% duty cycle of flashing lights produced little effect on the waterfowl. It appeared that waterfowl easily adapted to this cycle and did not avert the settlement even though the area was saturated with several apparatuses. Initial design of the apparatus also showed a problem with waterfowl roosting on the apparatus if it was stable while floating. This discovery lead to the current design of a self up-righting, singular, tubular structure. The present invention design produces an unstable surface in water for the waterfowl to roost and each roost attempt seen was unsuccessful. Also, the adaptation to a rhythmic 50% duty cycle of flashing light, lead to the usage of a compound cycle of distinct, unique light flash patterns.

U.S. Pat. No. 7,506,815, issued Mar. 24, 2009, to Spiegel, describes a method to repel and disperse waterfowl using a autonomous laser beam generator that self activates via a motion detector and times out based on an elapsed timer. While this may be effective, the risk of humans being contacted by the laser may be great. Errant lasers not only pose a risk to humans, but also to the aviation community. There does not appear to be a method in place to maintain the direction of the laser and to assure that there is no contact with either humans or aviation community. Also, if used on a waterway, or on a floating dock area, or swim platform, the self activated laser system can pose a risk by temporally blinding boaters in the path of the laser.

U.S. Pat. No. 7,699,018 issued Apr. 20, 2010, to Wells, describes a method and apparatus to repel geese by using a single predetermined frequency flashing light mounted on a floatation ring. There is mention of using a product by Sunnyworld, from Shezhen Xinhonghua Solar Energy Co with a model number of SW-JSL003, traffic flash light, as the light source. The floatation ring on this device introduces an area for waterfowl to roost and possibly avoid exposure to the light. Also, the amber color of the light source does not fall into the range of effecting dark-adapted nighttime vision. In fact, amber can be associated with the range of color that does not effect the rods in the eye for dark-adapted nighttime vision. Also, the single rhythmic cyclical flashing light pattern, in our testing showed adaptability by the geese. The combination of the amber color and single rhythmic cyclical flashing light pattern may not be as effective as desired. Also, the Wells patent included both an upper and a lower floatation tube with a sealing collar between them, along with a stabilizing floatation ring.

The present invention avoids a place for possible roosting by using a singular elongated floatation tube that will list to any side or move down into the water, with any attempt by waterfowl to roost on top of the unit. For added roosting avoiding measure, this invention may include a bird spike to prevent an attempt to roost. This invention utilizes two spectrums of light, unlike a single spectrum as in the Wells patent; the green spectrum of 500 nm to 570 nm on frequency to a band about 540 THz., the green region of the visual spectrum, the brightest color perceived by the rods at dusk and night time, and the UVA spectrum of 300 nm to 399 nm, a spectrum also seen by geese. The 500 nm to 570 nm on frequency to a band about 540 THz produces the maximum sensitivity to the rods within the eye once dark-adapted nighttime vision has been achieved. The choice of these specific light spectrum LED's produced the best results in testing and is preferred for use within this invention. Also, this invention utilizes a microcontroller and its associated coding to provide an unlimited number of light patterns which may be combined to form a single compound cycle that is unadaptive by the geese.

BRIEF SUMMARY OF THE INVENTION

The present invention provides a method and apparatus for averting waterfowl settlements, which is environmentally safe, non-lethal and inhibits them from bedding down for the night time or longer including for a floating version, an elongated tubular floatation buoy, ballast, anchor point, closed cell floatation insert to prevent sinking of buoy, solar panel to recharge a battery power source and means to sense ambient light to activate device, a rechargeable battery power source, a microcontroller, microcontroller code, an LED array of visible light spectrum and UVA spectrum, several distinct LED flashing and changing light patterns developed with the microcontroller code, among the countless variations available through direct coding of the microcontroller, which do not allow the waterfowl to become acclimated to the light patterns. This device is activated by low levels of sunlight during overcast days and from dusk until dawn. The apparatus is to be deployed in a body of water or on land. It will do this by operating in the visible light spectrum as well as the UVA spectrum. The LED array may be of any color within the visible light spectrum and the UV spectrum, however, in the preferred embodiment, this device uses the 500 nm-570 nm in the visible spectrum and the 300-399 nm UVA spectrum. The inventive device may use any combination of visible light and UVA spectrum LEDs available. The preferred embodiment of the present invention has a floatation level at or near the eye line of resting waterfowl which may be on the order of 17".

BRIEF DESCRIPTION OF THE SEVERAL VIEWS OF THE DRAWING(S)

DETAILED DESCRIPTION OF THE INVENTION

Figure 1:
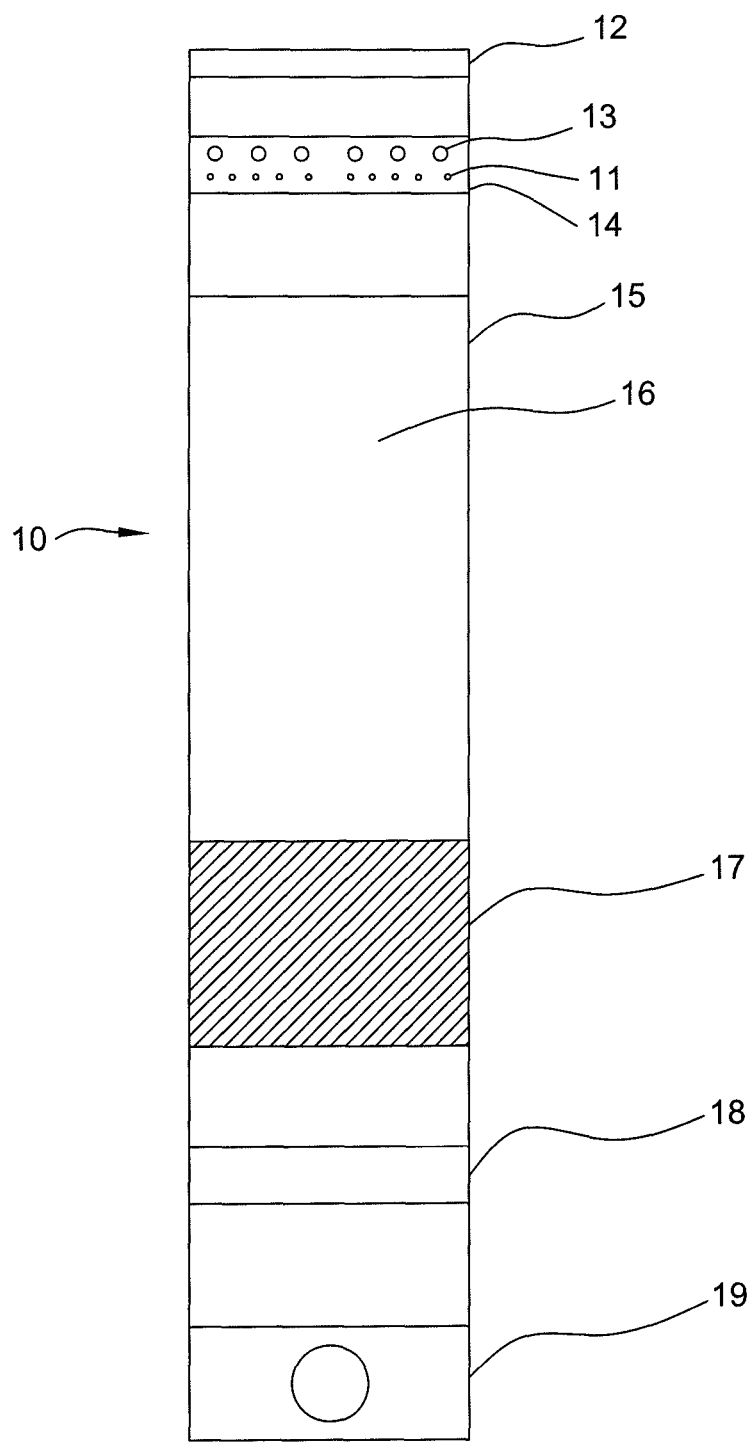
FIG. 1 is a schematic and exploded diagram of an exemplary water based apparatus and its associated components in accordance with the present invention.

FIG. 1 shows an exploded diagram, generally indicated at 10, of the invention that is a water based model. It contains a solar panel 12 used to collect sun energy and convert it to direct current and dc voltage to recharge a rechargeable battery power source (not shown) as well as to activate the device dependent upon ambient light levels.

The LED's 13 shown encircle the tubular housing cap 14 in order to achieve a complete 360 degree radius of exposure. Preferably a total of 18 LED's spaced at an angle of 20 degrees apart are provided with 6 of the LED's at 60 degree angles apart being UVA spectrum have been provided. These may be varied in different numbers and position. The LED's 13 are controlled and in a manner by the microcontroller (not shown) through running the internal code (not listed here) to achieve a changing pattern, varying in a number of arrays until the compound cycle has completed only to repeat again. The LED's 13 and circuitry, inclusive of charge circuit, hysteresis delay, microcontroller (not shown), internal code for compound flash pattern (not listed here), optional battery storage, and voltage regulation are all housed within the upper cap 14. Upper cap 14, seals the single elongated tubular housing 5, making the apparatus water resistant but not water tight because of the vent holes 11 required for proper ventilation. The tubular housing 15 contains ballast material 17 which may or may not include a rechargeable battery pack, depending on the option chosen for construction. The ballast material 17 resides at the bottom of the tubular housing 15 to provide a method for self up-righting capability. The tubular housing 15 also may contain a closed cell marine foam insert to keep the device from completely sinking in the event of a catastrophic exposure to water and water intake. The bottom of the tubular housing 15 is outfitted with an bottom end cap 18 that seals the unit and make the bottom water tight. The bottom end cap 18 is fitted with an anchor boot 19 to provide a point located for an anchor chain or rope attachment.

Figure 2:
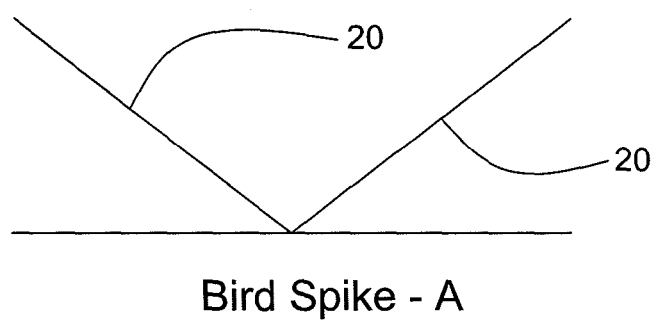
FIG. 2 is a schematic showing of several designs for bird spikes to be set atop the solar panel as an option or standard component.
Figure 2:
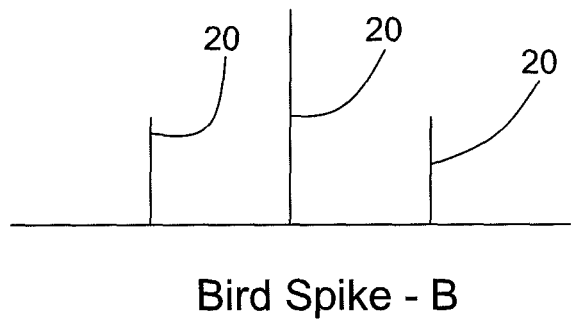

FIG. 2 shows optional designs for bird spikes 20 to attach to the solar panel as shown in FIG. 1. Either bird spike 20 may be constructed from wire mesh or cast from clear casting resin. Although this option does not seem to be necessary because the preferred housing of the invention's invention floatation version is such that when waterfowl do attempt to roost atop the device, its chances of success are very limited because the device will give way and list to either side thereby preventing the roost or dunk down in the water. However, it is still offered as an option.

Figure 3:
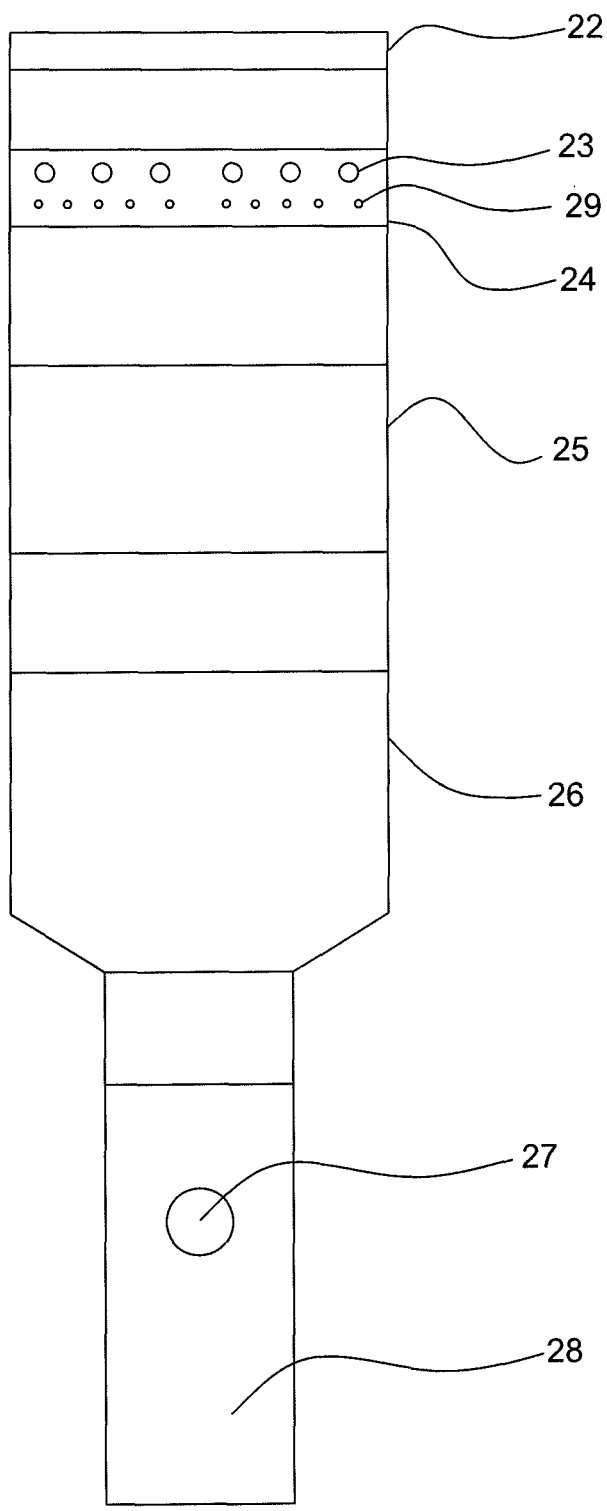
FIG. 3 is an exemplary exploded diagram of a land based apparatus.

FIG. 3 shows an exploded diagram of the invention that is a land based model. It will be appreciated that the present device may be provided with a suitable base or holder to mount it on a land or water structure. It contains a solar panel 22 used to collect sun energy and convert it to direct current and direct voltage to recharge a rechargeable battery power source (not shown) as well as to activate the device dependent upon ambient light levels.

Figure 4:
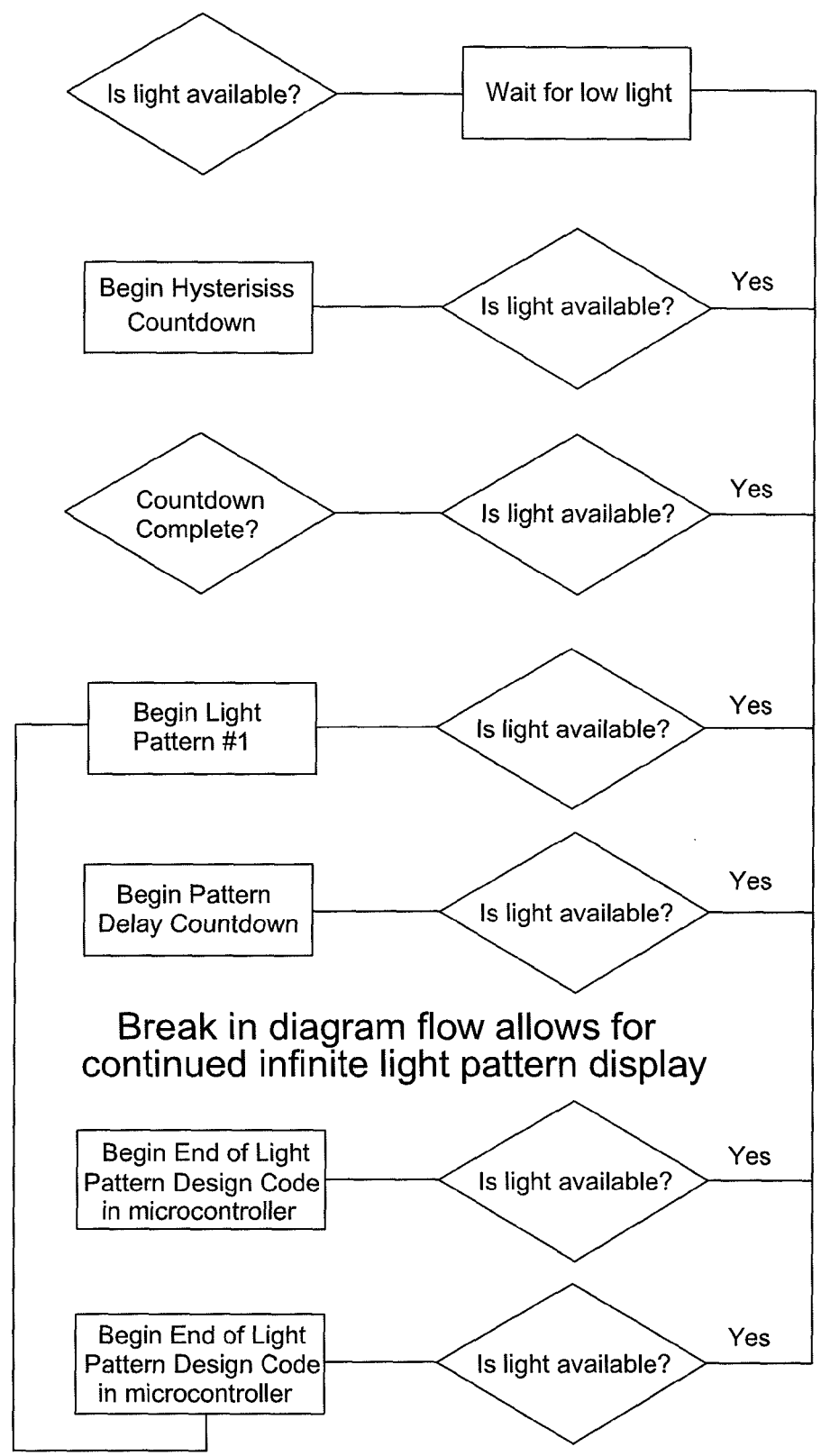
FIG. 4 is a flow diagram of circuitry and microcontroller code for the present invention.

FIG. 4 shows an operational flowchart of the logic behind the activation and deactivation of the invention determined by the available ambient light level.

Figure 5:
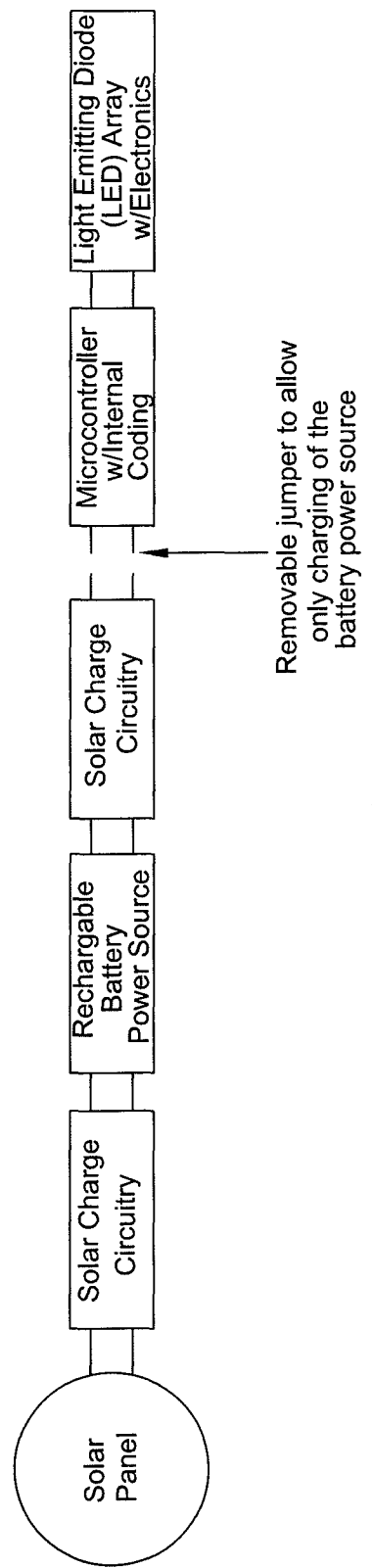
FIG. 5 is a block diagram of a preferred overall electronic design.

FIG. 5 shows a block diagram of the electronic components of the invention. There is provided an optional removable jumper, which, when removed, allows independent charging of the battery power source and a complete disconnect of the microcontroller and LED array. This feature enhances the functionality of the invention by providing a separate solar charging system for rechargeable batteries.

Figure 6:
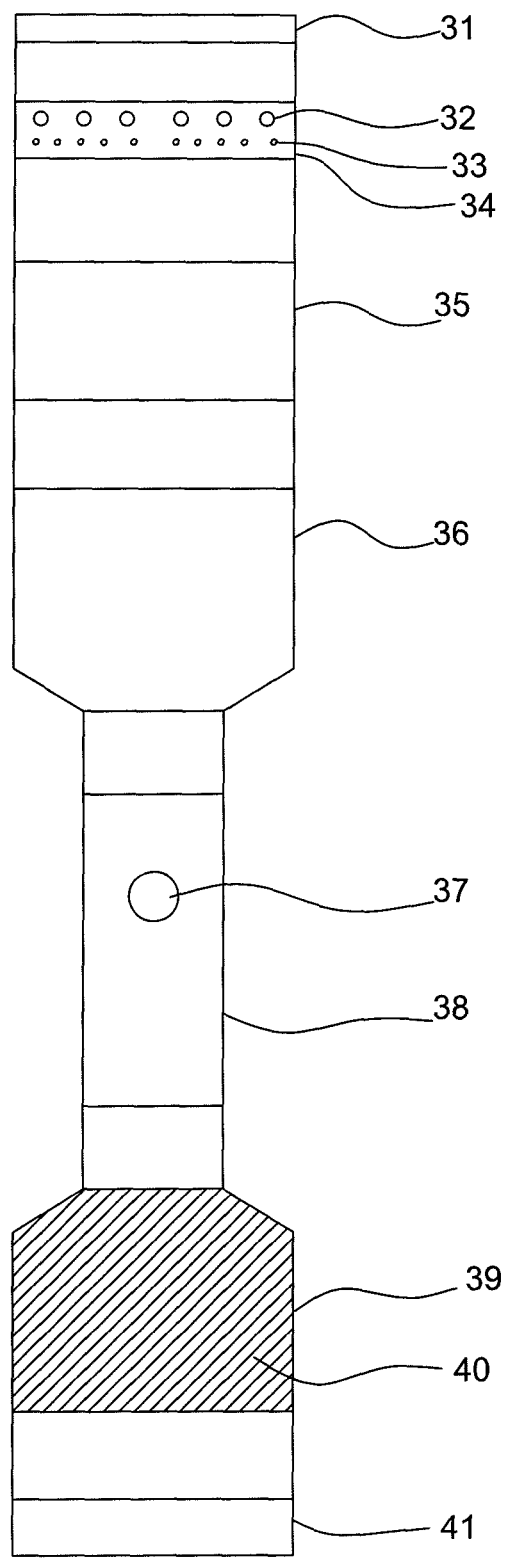
FIG. 6 is an exemplary exploded diagram of a rooftop portable apparatus.

FIG. 6 shows an exploded diagram of the invention that is a rooftop portable model. It contains a solar panel 31 used to collect sun energy and convert it to direct current and direct voltage to recharge a rechargeable battery power source (not shown) as well as to activate the device dependent upon ambient light levels. It also contains a base 39 filled with ballast material 40 enclosed with an end cap 41.

The LED's 23 shown encircle the invention in order to achieve a complete 360 degree radius of exposure. The LED's 23 are controlled and in a manner by the microcontroller (not shown) through running the internal code (not listed here) to achieve a non repetitive and charging pattern until the compound cycle has terminated only to repeat again. The LED's 23 and circuitry, inclusive of charge circuit, hysteresis delay, microcontroller (not shown), internal code for compound flash pattern (not listed here), optional battery storage, and voltage regulation are all housed within the upper cap 24. Upper cap 24, seals the tubular housing 25 making the apparatus water resistant but not water tight because of the vent holes 29 required for proper ventilation. The tubular housing 25 may or may not include a rechargeable battery pack, depending on the option chosen for construction. The tubular housing 25 connects to a reducer 26 which in turn connects to a ground stake tube 28 that allows securing the invention to a ground anchor. The ground stake tube 28 is equipped with a transfer hole to permit attachment of an anti theft system to the land based model of the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A method to avert waterfowl settlements, either on land or water, comprising subjecting a preselected area to a compound cycle of flashing and changing LED arrays, and providing several distinct light spectrum with the LED arrays, varying in length and duration, changing both in frequency and intensity, and creating non adaptable patterns of light pulses together comprising a compound cycle of different emitted light spectra determined by a selected coding of a powered microcontroller based circuitry.

2. The method as claimed in claim 1 wherein the power source is a solar power assembly and a rechargeable battery pack, the solar panel charges the battery pack and means is provided to activate the microcontroller circuitry and run a microcontroller code directing the emitted patterns of light pulses.

3. The method as claimed in claim 1 that further disrupts the dark-adapted nighttime vision of waterfowl by UVA light emissions included in the LED array, thereby weakening the waterfowl defense mechanism and producing an aversion to the area.

4. Apparatus to avert waterfowl settlements, comprising, an elongated tubular housing having an end cap, a solar panel mounted on top of the housing cap to recharge a battery power source and means to sense ambient light for device activation, a microcontroller, a microcontroller coded and activated, LED array located in the upper end cap of the housing, and means to execute the microcontroller code to flash the LED array of lights in a number of predetermined changing and varying patterns of light pulses of different spectra.

5. Apparatus as claimed in claim 4 including visible and UVA spectra flashing LED's which disrupts dark-adapted night time vision of waterfowl in such a manner as to require a reset period to regain dark-adapted vision during which time weakens their visual nocturnal defense system enough to avert settlement.

6. Apparatus as claimed in claim 5 wherein said housing is adapted to function as a flotation buoy.

7. Apparatus as claimed in claim 6 wherein said housing is an elongated tubular member and contains internal flotation material and ballast.

8. Apparatus as claimed in claim 7 wherein bird spikes are mounted atop the solar collector panel.

9. Apparatus as claimed in claim 5 wherein said housing is adapted to be ground mounted.

10. Apparatus as claimed in claim 5 wherein said housing is adapted to be mounted to a structure.

11. Apparatus as claimed in claim 5 wherein said patterns of light pulses are selected from the group consisting of increasing, decreasing, or alternative cycles of flashing.

12. Apparatus for averting waterfowl settlements, comprising an elongated tubular housing having upper and lower end caps, said upper end cap carrying an array of LEDs providing several distinct light spectra emissions, a microcontroller circuitry including a preset code to flash the LED array of light in a number of predetermined changing and varying light pulses of different patterns and spectra, means for powering the controller, and ambient light sensing means for activating and deactivating the power means, wherein said power source is a rechargeable battery pack and a solar panel means is mounted on top of the upper end cap connected to recharge the battery pack.

13. Apparatus as claimed in claim 12 wherein said adapter means receives a fixed surface mounting means.

14. Apparatus as claimed in claim 12 including means for preventing perching on the housing.

15. Apparatus for averting waterfowl settlements, comprising an elongated tubular housing having upper and lower end caps, said upper end cap carrying an array of LEDs providing several distinct light spectra emissions, a microcontroller circuitry including a preset code to flash the LED array of light in a number of predetermined changing and varying light pulses of different patterns and spectra, means for powering the controller, and ambient light sensing means for activating and deactivating the power means, wherein the lower end cap receives adapter means for coupling to securing means, and wherein said housing is adapted to act as a flotation buoy and contains a flotation material insert and ballast, and said adapter means receives a connecting line to an anchor.

16. Apparatus as claimed in claim 15 wherein the power source is a rechargeable battery pack.

* * * * *